United States Patent [19]
Hartmann et al.

[11] Patent Number: 5,630,698
[45] Date of Patent: May 20, 1997

[54] CONVERTER FOR PROVIDING A LIQUID AT A MEASUREMENT PRESSURE CORRESPONDING TO A ROTATIONAL SPEED

[75] Inventors: Matthias Hartmann, Görlitz; Dieter Mürbe, Dresden, both of Germany

[73] Assignee: Siemens Aktiengesellschaft, Munich, Germany

[21] Appl. No.: 528,960

[22] Filed: Sep. 15, 1995

Related U.S. Application Data

[63] Continuation-in-part of PCT/DE94/00214, Feb. 28, 1994 published as WO94/22020, Sep. 29, 1994

[30] Foreign Application Priority Data

Mar. 15, 1993 [DE] Germany ............ 43 08 206.8

[51] Int. Cl.$^6$ .............. F01D 17/06; F01D 17/08; F01D 17/26; G01P 3/28
[52] U.S. Cl. ............ 415/17; 415/29; 415/36; 415/118; 60/660; 73/494; 73/502; 73/521
[58] Field of Search ............ 415/17, 26, 29, 415/30, 36, 118; 73/494, 502, 521; 60/660

[56] References Cited

U.S. PATENT DOCUMENTS

| | | | |
|---|---|---|---|
| 2,467,445 | 4/1949 | Schwendner | 415/36 |
| 3,347,103 | 10/1967 | High et al. | 73/502 |
| 3,395,718 | 8/1968 | Wolff. | |
| 3,473,389 | 10/1969 | Howland | 73/521 |
| 4,602,509 | 7/1986 | Berdahl | 73/502 |

FOREIGN PATENT DOCUMENTS

| | | |
|---|---|---|
| 1268888 | 5/1968 | Germany. |
| 1798268 | 3/1972 | Germany. |
| 3138561 | 4/1983 | Germany. |
| 3138562 | 4/1983 | Germany. |

OTHER PUBLICATIONS

Book: "Steam and Gas Turbines" by B. G. A. Skrotzki and W. A. Vopat, McGraw–Hill Comp., Inc., New York, 1950, chapter 7, p. 229 ff.

*Primary Examiner*—Thomas E. Denion
*Assistant Examiner*—Christopher Verdier
*Attorney, Agent, or Firm*—Herbert L. Lerner; Laurence A. Greenberg

[57] ABSTRACT

A converter assembly for providing a liquid in a measuring line includes a stationary housing and a component being rigidly connected to the housing. A journal is slidingly supported in the stationary housing and defines a gap disposed between the component and the journal forming a throttle. The journal has an axis of rotation, an end, at least one transverse bore formed in the journal, and a journal bore formed in the journal from the end along the axis. The housing has a groove formed therein surrounding the journal and communicating with the journal bore through the at least one transverse bore. A liquid flow path communicates with a reservoir at a primary pressure and a pressureless sump and includes the throttle, the groove, the transverse bore and the journal bore. A measuring line branching off from the path between the transverse bore and the throttle carries the liquid at a measurement pressure corresponding to a rotational speed of the journal rotating about the axis.

27 Claims, 2 Drawing Sheets

CONVERTER FOR PROVIDING A LIQUID AT A MEASUREMENT PRESSURE CORRESPONDING TO A ROTATIONAL SPEED

CROSS-REFERENCE TO RELATED APPLICATION

This application is a Continuation of International Application PCT/DE94/00214, filed Feb. 28, 1994 published as WO94/22020, Sep. 29, 1994.

BACKGROUND OF THE INVENTION

Field of the Invention

The invention relates to a converter for providing a liquid in a measuring line, wherein the liquid is at a measurement pressure corresponding to a rotational speed of a journal rotating about an axis, the journal is slidingly supported in a stationary housing and has a journal bore formed therein from one end of the journal along the axis of rotation; the housing has a first groove which surrounds the journal and communicates with the journal bore through at least one transverse bore in the journal; a flow path for the liquid which can communicate with a reservoir at a primary pressure and with a pressureless sump, includes a throttle, the first groove, the transverse bore and the journal bore; and the measuring line branches off from the path between the transverse bore and the throttle.

Such a converter is also known as an impeller or an rpm-pressure converter. It uses the measurement pressure to furnish a hydraulic signal which is a measure for the rotational speed. Such a converter is applicable in particular to governing the speed of a power engine, especially a steam turbine. To that end, the rotating journal is connected to a driven shaft of the power engine, and the rpm-dependent pressure provided in the measuring line serves to control a device with which the rotational speed can be varied. In the event that the power engine is a steam turbine, that device is, by way of example, a throttle valve or a configuration of a plurality of throttle valves, along with an associated adjusting device. Since the converter provides a hydraulic signal directly, it is especially suitable for inclusion in a hydraulic regulating device of the kind often used in steam turbines.

Converters of the type described at the outset, each being associated with a steam turbine, are found in the book "Steam and Gas Turbines" by B. G. A. Skrotzki and W. A. Vopat, McGraw-Hill Comp., Inc., New York, 1950, chapter 7, pp. 229 ff., and particularly page 240, FIG. 7–18, and page 246, FIG. 7–28. Each of those figures shows a converter of the type described. In each of the converters shown therein, an annular groove (referred to as a "first groove" in the first paragraph above) in a bearing bore of a housing, in which a journal connected to a driven shaft rotates, is supplied with liquid through a further line in which a diaphragm is disposed as a throttle, from a reservoir which in particular is a line system being acted upon at a largely constant primary pressure by a main oil pump. The measuring line, in which the liquid is to be provided at a measurement pressure being dependent on the rpm of the journal, branches off from the groove. The mode of operation of the converter is based on the fact that a flow equilibrium is established between the reservoir and the measuring line, with the equilibrium being dependent on the rpm of the journal. To that end, the journal includes a journal bore, which is formed along its axis of rotation and into which transverse bores, formed approximately perpendicular to the axis of rotation, discharge. Those transverse bores connect the groove to the journal bore. Depending on the rpm of the journal, a more or less large amount of liquid flows through the transverse bores into the outlet bore, and from there flows to a pressureless sump, in other words a collecting tank for the liquid. The outflow of the liquid through the transverse bores is hindered more by centrifugal force as the journal rotates faster. As a result, a pressure arises in the groove from the flow equilibrium being established, that pressure is dependent on the journal rpm and is propagated into the measuring line in the form of the desired measurement pressure. Although the book shows converters having journals which are direct extensions of the given shafts of steam turbines, nevertheless converters of that kind have not proven themselves in practice, since in particular small eccentricities in the positioning of the journal, which are due to the driven shaft play that always exists, excessively impair the function of the converter. Other disadvantages, especially in steam turbines, often reside in the high rotational speeds of the driven shafts, which make it substantially more difficult to dimension the converters. For that reason, in practice converters are not provided directly on the driven shafts but rather on separate shafts, which rotate relatively slowly and are driven by the driven shafts through suitable gears.

The book also explains an inclusion of an rpm-pressure converter in a closed-loop control unit for a steam turbine and hydraulic closed-loop control units in particular are described in detail. The preference for hydraulic control units is based in particular on the fact that a conventional power engine always has a liquid available that is suitable for hydraulic purposes, namely lubricating oil, from a source of adequately high primary pressure, and can thus readily be used to operate a hydraulic control unit.

Other descriptions of closed-loop control units for steam turbines and protected devices, which typically are components of such control units, may be found in German Published, Non-Prosecuted Applications DE 31 38 561 A1 and DE 31 38 562 A1. Details on hydraulic shifting and adjusting members can be found in particular from those references. U.S. Pat. No. 3,395,718 discloses an rpm-pressure converter which, unlike the converters described in the first paragraph above, does not use an essentially stationary flow equilibrium that is dependent on the rpm of the journal. Instead, in it pulses in the form of pressure waves are generated in the liquid, and the predetermined transit time of those waves through a delay line is set into a relation with the variable rpm. After passing through the delay line, the pulses are supplied to a switch formed on the journal, and the switch connects the delay line to the measuring line and the sump in alternation. Depending on the speed of rotation, a more or less large proportion of the pulses arrives in the measuring line. In that way, the measurement pressure which is dependent on the rpm is generated in the measuring line, and a hydraulic actuator is acted upon by that measurement pressure. That converter can be referred to as a "digital" converter, using the conventional vocabulary of electronics, since it primarily processes only certain predetermined unit pulses. A converter of the type described in the first paragraph above, which makes do without pulses, can instead be considered as an "analog" converter. In contrast to the analog converter, such components as throttles are intrinsically entirely foreign to the digital converter.

A converter of the type referred to in the first paragraph above, that is, an analog converter, is also disclosed in German Published, Non-Prosecuted Application DE 17 98 268 A1, corresponding to U.S. Pat. No. 3,473,389. In that converter, the journal bore is widened to make a chamber, from which the liquid that flows in through transverse bores in the journal and part of which flows out through a throttle to a sump, is partly supplied to hydraulic measuring instruments through corresponding lines. The journal rotates in a separate housing and is widened in the manner of a cylindrical can. The entire interior of the housing outside the journal can be considered to be a first groove in the present sense. A second groove encompassing the journal is provided in the housing away from the can-like widening of the journal and the first groove. The second groove communicates through transverse bores and a longitudinal bore with the likewise greatly widened journal bore itself, and from it the measuring line leads to the hydraulic adjusting device.

SUMMARY OF THE INVENTION

It is accordingly an object of the invention to provide a converter for providing a liquid at a measurement pressure corresponding to a rotational speed, which overcomes the hereinafore-mentioned disadvantages of the heretofore-known devices of this general type, in which a rotatable journal can be joined directly to a driven shaft that rotates at high speed and is part of a power engine, and in which no disadvantageous influences from possible eccentricities of the journal or fluctuating temperatures of the liquid occur. Moreover, the converter should be constructed as simply as possible and should be suitable for mass production.

With the foregoing and other objects in view there is provided, in accordance with the invention, a converter assembly for providing a liquid in a measuring line, comprising a stationary housing; a component being rigidly connected to said housing; a journal being slidingly supported in said stationary housing and defining a gap disposed between said component and said journal forming a throttle, said journal having an axis of rotation, an end, at least one transverse bore formed in said journal, and a journal bore formed in said journal from said end along said axis; said housing having a first groove formed therein surrounding said journal and communicating with said journal bore through said at least one transverse bore; a reservoir at a primary pressure; a pressureless sump; a liquid flow path communicating with said reservoir and said sump and including said throttle, said first groove, said transverse bore and said journal bore; and a measuring line branching off from said path between said transverse bore and said throttle, said measuring line carrying the liquid at a measurement pressure corresponding to a rotational speed of said journal rotating about said axis.

One important characteristic of the converter according to the invention is the inclusion of the throttle into the bearing of the journal in the housing, because this assures that a possible alteration in the delivery of liquid to the journal that might result from an eccentricity of the journal will be compensated for by the fact that the throttle likewise undergoes a corresponding change of shape and adapts the resistance of the slightly varied geometry of the journal that it offers to counter the liquid flowing through it. The result is a measurement pressure that is largely independent of the eccentricity of the journal in the housing. It has also been demonstrated that the geometry of the converter has the effect of ensuring that the measurement pressure is not only very slightly dependent on the temperature of the liquid. This is also due to the fact that possible leakage of the liquid from the first groove is compensated for by changes in the same direction in the flow of the liquid through the gap that forms the throttle. Overall, it can thus be stated that the converter according to the invention permits especially accurate determination of the speed of rotation by evaluating the measurement pressure, with this determination being at most only slightly influenced by possible eccentricities and/or temperature fluctuations that occur during operation. Additionally and especially for very high rpm, of the kind that often occurs in steam turbines for industrial use, it is possible to reliably obtain a hydraulic signal, that is of the measurement pressure. Series-connected gearing, which thus far has often been used to operate known analog converters, can possibly be dispensed with.

Substantial simplifications in hydraulic closed-loop control systems are made possible by using the converter of the invention. Moreover, the converter is distinguished by an especially simple manufacture, since the provision of a separate throttle is not needed, because the throttle is produced in the form of a gap between two components that are present anyway. The converter is therefore also especially well-suited to economical mass production.

In accordance with another feature of the invention, the journal of the converter has a cylindrical shape and is supported in a cylindrical bearing bore of the housing, in which bore the first groove is provided as a corresponding recess. This embodiment contributes especially to an economical manufacture of the converter and its components.

In accordance with a further feature of the invention, the bearing bore has a second groove spaced apart from the first groove along the axis of rotation; the throttle is a gap between the journal and the bearing bore, through which gap the second groove communicates with the first groove; and the measuring line branches off from the first groove. As a result of this embodiment, liquid that reaches the journal bore through the transverse bores of the journal must flow out to the sump. The flow equilibrium that is relevant to develop the measurement pressure in the converter is thus created to a substantial extent within the gap between the journal and the bearing bore. As a result, this converter is not very sensitive to eccentricities of the journal in the bearing bore, since any possible change in the gap that forms the throttle, resulting from eccentricity with respect to its effect, is compensated for by the effect of adjacent gaps that are changed in synchronism, through which leakage flows from the first groove or the second groove through the gap between the journal and the bearing bore. This configuration is also hardly sensitive to temperature changes in the liquid, which is of especially major significance for steam turbines in order to assure a satisfactory starting process, in which the liquid must necessarily heat up considerably.

In accordance with an added feature of the invention, the second groove encompasses the axis of rotation, so that between the first groove and the second groove a gap that entirely encompasses the journal is available, and thus any leakage that occurs is kept especially slight.

In accordance with an additional feature of the invention, the first groove, from which the measuring line branches off in the context of the particularly preferred embodiment, is located between the second groove and the journal end, since this is likewise advantageous in order to avert major leakage. Intrinsically, in the context of the embodiment described at this point, leakage originating in the second groove plays at most a secondary role, and leakage from the first groove can flow away only in the direction of the journal end, in which case only a slight pressure gradient, namely the difference between the measurement pressure and the pressure in the sump, is available.

In accordance with yet another feature of the invention, in order to further increase the accuracy of the measurement pressure obtainable from this converter, the converter is immediately adjacent to a slide bearing associated with the journal, wherein the slide bearing has a bearing gap that is smaller than the gap in the converter, which as has been noted in detail represents the throttle of the converter. In this way, vibrations of the journal, which could impair the converter, are suppressed to a marked extent, and it moreover limits the eccentricity of the journal to a non-problematic value.

In accordance with yet a further feature of the invention, the journal bore in the journal of the converter is axially symmetrical relative to the axis of rotation, in order to assure that numerous transverse bores which may be present will have essentially the same properties with respect to the carrying of the liquid, and the development of pressure waves in the liquid will be averted. In this way, a uniform flow of the liquid to the journal bore and in the journal bore is attained, which contributes to the accuracy of the relationship between the measurement pressure and the rpm.

In accordance with yet an added feature of the invention, the journal bore widens conically toward the journal end, since in this way the removal of the fluid is reinforced by centrifugal force, which contributes to the development of a defined pressure in the journal bore. In particular, it is possible to impart a certain pressure to the liquid flowing to the sump, which reinforces the pumping of liquid out of the converter.

In accordance with yet an additional feature of the invention, in the context of an alternative embodiment of the converter according to the invention, the journal bore in the vicinity of the journal end is rotationally symmetrical relative to the axis of rotation; and a stopper rigidly joined to the housing protrudes into the journal bore, wherein a gap left between the stopper and the journal forms the throttle, and wherein the measuring line branches off from the journal bore through the stopper. In the context of this embodiment, leakage from the journal bore in which the desired measurement pressure is established can be practically prevented, because aside from the measuring line there is only a single possible way for the liquid to flow out of the journal bore, and that is in fact through the gap acting as a throttle. Since leakage from the first groove, which is to be acted upon by the primary pressure in the context of the embodiment just described, reaches the sump directly and accordingly plays no role in the development of the measurement pressure, the result is accordingly a measurement pressure that is largely independent of leakage. The construction of the converter of the embodiment just described is also especially simple, since only a single groove is needed in the bearing bore, and the throttle results automatically upon assembly.

In accordance with again another feature of the invention, the converter of the embodiment just described is also preferably immediately adjacent a bearing associated with the journal, so that vibration and eccentricities can be largely avoided as already described.

In accordance with again a further feature of the invention, in the converter of whichever embodiment, the first groove encompasses the axis of rotation, so that the most axially symmetrical construction of the functionally important components is assured and pressure fluctuations in the liquid are avoided.

In accordance with again an added feature of the invention, the journal has a plurality of transverse bores, preferably at least four transverse bores. Once again, this contributes to assuring the most axially symmetrical possible flow path for the liquid in the converter, and it is favorable for the sake of a uniform flow of liquid.

In accordance with again an additional feature of the invention, the converter of whichever embodiment is especially well-qualified for disposition directly on a driven shaft of a power engine, without the interposition of a gear. Thus with little structural effort or expense, the converter makes it possible to obtain a high-quality hydraulic signal for determining the rpm of the driven shaft.

In accordance with still another feature of the invention, the converter of whichever embodiment is used with an oil, in particular a lubricating oil or a hydraulic oil, as the liquid in which the desired measurement pressure is to be provided.

In accordance with still a further feature of the invention, the converter is operated to provide the liquid, which is at the measurement pressure corresponding to the rotational speed, preferably at a rotational speed between approximately 6000 rpm and approximately 20,000 rpm, and in particular between 9000 rpm and 16,000 rpm. Thus the converter is especially well-qualified for use together with a steam turbine.

In accordance with still an added feature of the invention, the liquid that is at the measurement pressure is preferably supplied to a hydraulic speed governor for the shaft, having a component which is the journal of the converter. The speed governor is in particular associated with a power engine, such as a steam turbine, and the shaft on which the converter is mounted is a driven shaft of the power engine.

In accordance with still an additional feature of the invention, the converter is dimensioned and operated in such a way that the measurement pressure provided is between $1\times10^5$ Pa and $4\times10^5$ Pa. The primary pressure, that is the pressure at which the liquid is supplied to the converter, is preferably approximately $10^6$ Pa. In accordance with a concomitant feature of the invention, the converter is constructed, and the primary pressure and the measurement pressure are adjusted, in such a way that the measurement pressure is between 10% and 60% of the primary pressure, and preferably between approximately 30% and approximately 50% of the primary pressure. This dimensioning assures high accuracy in the adjustment of the measurement pressure as a function of the rpm. A dependency of the measurement pressure on the rpm that is especially favorable for use for speed control in a steam turbine, is especially attained with a converter in the particularly preferred embodiment described above.

Other features which are considered as characteristic for the invention are set forth in the appended claims.

Although the invention is illustrated and described herein as embodied in a converter for providing a liquid at a measurement pressure corresponding to a rotational speed, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
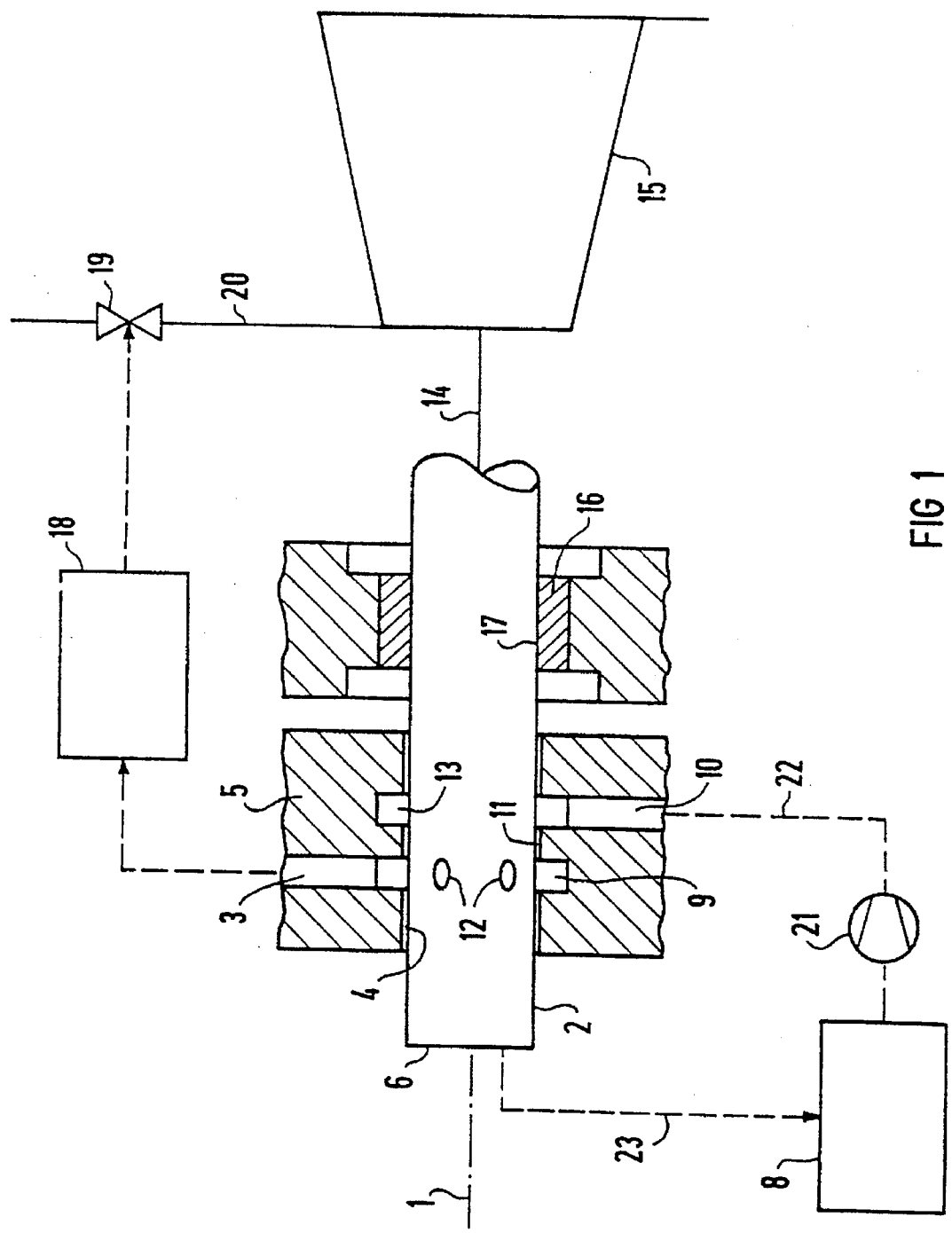
FIG. 1 is a fragmentary, diagrammatic, longitudinal-sectional view of a particularly preferred embodiment of a converter according to the invention with a schematic and block circuit diagram indicating characteristics for using and applying the converter.
Figure 2:
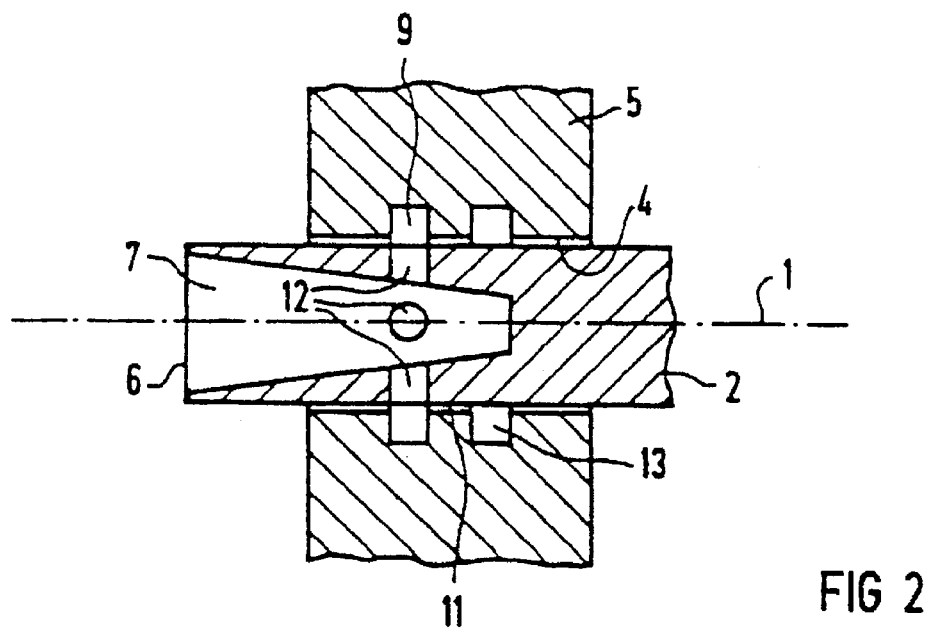
FIG. 2 is a fragmentary, longitudinal-sectional view showing further details of the converter of FIG. 1.

Referring now in detail to the figures of the drawings, parts of which are slightly distorted in order to emphasize certain characteristics of the converter, and first, particularly, to FIGS. 1 and 2 thereof as a whole, there is seen a converter which has a journal 2 that is rotatable about an axis of rotation 1 and is disposed in a bearing bore 4 of a housing 5. A first groove 9 is machined into the housing 5 at the bearing bore 4. The first groove 9 surrounds the axis 1 and communicates with a measuring line 3, in which a liquid at a measurement pressure is to be provided. In the present case, the measurement pressure is approximately quadratically dependent on a speed of rotation, or rpm, at which the journal 2 rotates about the axis 1. To that end, the first groove 9 is supplied from a reservoir 10 with the liquid that is at a predetermined primary pressure. The liquid flows to the first groove 9 through a throttle 11. The liquid passes from the first groove 9, through transverse bores 12, into a journal bore 7 located in the journal 2 and emerges from that bore at a journal end 6, from which it is delivered to a pressureless sump 8. When the journal 2 rotates, the flow of liquid through the transverse bores 12 is hindered by incident centrifugal force, so that the measurement pressure developing in the first groove 9 and in the measuring line 3 becomes higher as the rpm of the journal 2 becomes higher.

One important characteristic of the converter is the way in which the throttle 11 is constructed. That is, in order to supply the liquid, a second groove 13 located next to the first groove 9 is provided, and the liquid is supplied to it at the primary pressure. The throttle 11 is a gap which extends between the first groove 9 and the second groove 13, between the journal 2 and a component being rigidly connected to, and in particular integral with, the housing 5. Finally, a flow equilibrium which is important for the development of the measurement pressure is determined by this gap 11 and by the transverse bores 12. The first groove 9 is located between the second groove 13 and the journal end 6. As a result, a well-defined leakage flow to the journal end 6 results, which is determined by the same given geometrical conditions as the flow through the gap 11 and which is thus capable of compensating for fluctuations in this flow due to fluctuations in the eccentricity of the journal 2 or in the temperature of the liquid. The bore 7 in the journal 2 is constructed conically, so that centrifugal forces which arise from the rotation of the journal 2 will be utilized for removing the liquid.

Further characteristics for using and applying the converter may be learned from FIG. 1. The journal 2 directly forms an extension of a driven shaft 14 of a power engine 15, specifically a steam turbine 15. It has already been mentioned that the converter can be used in particular when the rotational speed of the journal 2 is very high, as is the case for a driven shaft 14 of a typical industrial steam turbine. A bearing 16 for the journal 2 or for the drive shaft 14 is disposed immediately next to the converter. The bearing is not part of the converter but is part of a converter assembly including the converter. This bearing 16 is a slide bearing and has a bearing gap 17 between the journal 2 and the bearing 16 that is markedly smaller than the gap 11 in the converter. In this way, a possible eccentricity of the journal 2 is limited by the bearing gap 17, which is favorable for the sake of exactness of the dependency of the measurement pressure on the rpm. The reservoir 10, from which the converter is acted upon by the liquid at the primary pressure, is typically a pipeline system. As is shown by way of example, the reservoir 10 is acted upon by the liquid through the use of a pump 21 and possible closed-loop control devices for the primary pressure. FIG. 1 shows a single inflow line 22 leading to the second groove 13, as a representative of such a pipeline system. In accordance with conventional practice, the liquid that acts upon the converter is carried in a circulatory loop. This loop is represented by an outflow line 23, through which the liquid, that emerges from the journal bore 7 at the journal end 6, is supplied to the sump 8, which in particular is a supply tank. The liquid travels from the sump 8 to the pump 21, from which it is brought to the primary pressure and supplied to the reservoir 10. It is understood that the outflow line 23, like the inflow line 22, should be considered to be representative of a relatively large pipeline system which, for instance, includes outflow lines for liquid that has emerged from bearings or other hydraulic systems.

In accordance with conventional practice, the converter is used to regulate the rotational speed of the steam turbine 15. To that end, a speed governor 18 is acted upon by the measurement pressure through the measuring line 3, and as a function of the measurement pressure, the speed governor 18 controls a corresponding turbine valve 19 in a turbine inflow line 20 through which the steam turbine 15 is subjected to steam. Typically, the speed governor 18 is a largely completely hydraulic system, which controls the likewise hydraulically actuated turbine valve 19. The question of whether the liquid is standing in the measuring line or flowing in it is not necessarily essential for the function of the converter. Optionally, in constructing the converter, attention should be paid to the demands made of the instruments and devices to be connected to the measuring line 3, one example of which is the speed governor 18.

Figure 3:
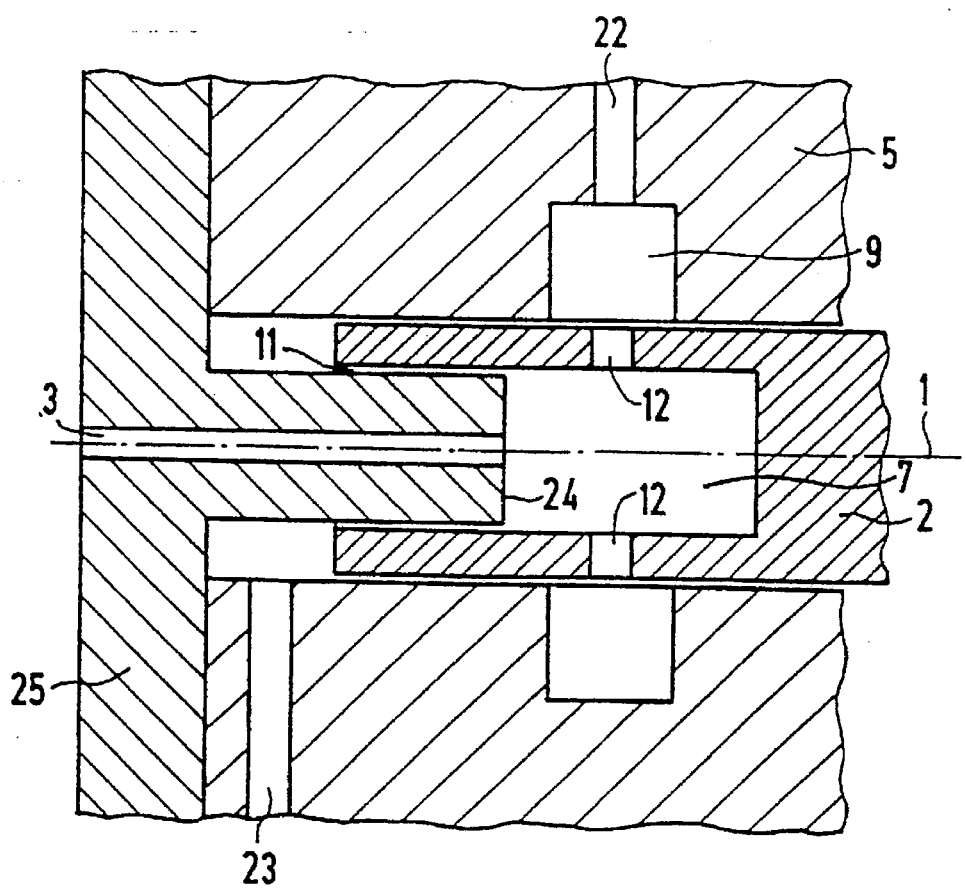
FIG. 3 is an enlarged, fragmentary, longitudinal-sectional view of another embodiment of the converter.

FIG. 3 shows another embodiment of the converter. In this converter, the journal 2 likewise rotates in a housing 5 and is encompassed by the first groove 9, which is acted upon through the inflow line 22 with the liquid that is at the primary pressure. The liquid passes from the first groove 9, through the transverse bores 12 and into the bore 7 of the journal 2. The journal bore 7 is closed through the use of a stopper 24, which protrudes into the journal bore 7 leaving the gap 11 that functions as the required throttle. Liquid that flows through the gap 11 is removed through the outflow line 23. The measuring line 3 branches off from the journal bore 7 through the stopper 24. The stopper 24 is disposed on a cap 25 with which the housing 5 is to be closed.

In the converter of FIG. 3, the measurement pressure depends in monotonically decreasing fashion on the rpm, unlike the converter of FIGS. 1 and 2, in which the measurement pressure depends monotonically increasingly on the rpm. In principle, however, this is no hindrance to the applicability of the converter for regulating a power engine.

The converter of whichever embodiment is distinguished by high accuracy of the dependency of the measurement pressure on the rpm, and it is particularly well suited for being joined directly to the driven shaft of a power engine of the type of a steam turbine used for industrial purposes. The use of the converter requires only a little effort and expense for equipment, yet it assures high operating reliability, particularly in conjunction with governing the rotational speed of a power engine.

We claim:

1. A converter assembly for providing a liquid in a measuring line, comprising:
   a stationary housing;
   a component being rigidly connected to said housing;
   a journal being slidingly supported in said stationary housing and defining a gap disposed between said component and said journal forming a throttle, said journal having an axis of rotation, an end, at least one transverse bore formed in said journal, and a journal bore formed in said journal from said end along said axis;
   said housing having a groove formed therein surrounding said journal and communicating with said journal bore through said at least one transverse bore;
   a reservoir at a primary pressure;
   a pressureless sump;
   a liquid flow path communicating with said reservoir and said sump and including said throttle, said groove, said transverse bore and said journal bore; and
   a measuring line branching off from said path between said transverse bore and said throttle, said measuring line carrying the liquid at a measurement pressure corresponding to a rotational speed of said journal rotating about said axis.

2. The converter assembly according to claim 1, wherein said housing has a cylindrical bearing bore in which said groove is disposed, and said journal is cylindrical and is supported in said cylindrical bearing bore.

3. The converter assembly according to claim 2, wherein: said groove is a first groove;
   said bearing bore has a second groove being spaced apart from
   said first groove along said axis of rotation;
   said gap defining said throttle is between said journal and said bearing bore;
   said second groove communicates with said first groove through said gap; and
   said measuring line branches off from said first groove.

4. The converter assembly according to claim 3, wherein said second groove encompasses said axis of rotation.

5. The converter assembly according to claim 3, wherein said first groove is disposed between said second groove and said journal end.

6. The converter assembly according to claim 3, including a slide bearing being associated with said journal and being immediately adjacent the converter, said slide bearing having a bearing gap being smaller than said gap between said journal and said bearing bore.

7. The converter assembly according to claim 1, wherein said journal bore is axially symmetrical relative to said axis of rotation.

8. The converter assembly according to claim 7, wherein said journal bore is conical.

9. The converter assembly according to claim 1, wherein said journal bore is rotationally symmetrical relative to said axis of rotation in the vicinity of said journal end; and including a stopper being rigidly joined to said housing and protruding into said journal bore, said gap defining said throttle being left between said stopper and said journal, and said measuring line branching off from said journal bore through said stopper.

10. The converter assembly according to claim 9, including a bearing being associated with the journal and being immediately adjacent the converter.

11. The converter assembly according to claim 1, wherein said groove encompasses said axis of rotation.

12. The converter assembly according to claim 1, wherein said at least one transverse bore formed in said journal is a plurality of transverse bores.

13. The converter assembly according to claim 1, wherein said at least one transverse bore formed in said journal is at least four transverse bores.

14. The converter assembly according to claim 1, wherein said journal is disposed on a driven shaft of a power engine or steam turbine, and the driven shaft is rotatable about the axis of rotation.

15. The converter assembly according to claim 1, wherein said path carries a liquid selected from the group consisting of an oil, a lubricating oil and a hydraulic oil.

16. The converter assembly according to claim 1, wherein said journal rotates at a rotational speed of between approximately 6000 rpm and approximately 20,000 rpm.

17. The converter assembly according to claim 1, wherein said journal rotates at a rotational speed of between approximately 9000 rpm and 16,000 rpm.

18. The converter assembly according to claim 1, including a speed governor being connected to said measuring line and being acted upon by the liquid at the measurement pressure.

19. The converter assembly accordance with claim 18, wherein said speed governor is associated with a power engine or steam turbine.

20. The converter assembly according to claim 1, wherein the measurement pressure is between $1 \times 10^5$ Pa and $4 \times 10^5$ Pa.

21. The converter assembly according to claim 1, wherein the primary pressure is approximately $10^6$ Pa.

22. The converter assembly according to claim 1, wherein the measurement pressure is between 10% and 60% of the primary pressure.

23. The converter assembly according to claim 1, wherein the measurement pressure is between approximately 30% and approximately 50% of the primary pressure.

24. A converter for providing a liquid in a measuring line, comprising:
   a stationary housing;
   a component rigidly connected to said housing;
   a journal slidingly supported in said stationary housing and defining a gap disposed between said component and said journal forming a throttle, said journal having an axis of rotation, an end, at least one transverse bore formed in said journal, and a journal bore formed in said journal from said end along said axis;
   said housing having a groove formed therein surrounding said journal and communicating with said journal bore through said at least one transverse bore;
   a reservoir at a primary pressure;
   a pressureless sump;
   a liquid flow path communicating with said reservoir and said sump and including said throttle, said groove, said transverse bore and said journal bore; and
   a measuring line branching off from said path between said transverse bore and said throttle, said measuring line carrying the liquid at a measurement pressure corresponding to a rotational speed of said journal rotating about said axis.

25. The converter according to claim 24, wherein said housing has a cylindrical bearing bore in which said groove is disposed, and said journal is cylindrical and is supported in said cylindrical bearing bore.

26. The converter according to claim 25, wherein:

said groove is a first groove;

said bearing bore has a second groove spaced apart from said first groove along said axis of rotation;

said gap defining said throttle is between said journal and said bearing bore;

said second groove communicates with said first groove through said gap; and said measuring line branches off from said first groove.

27. The converter according to claim 24, wherein said journal bore is rotationally symmetrical relative to said axis of rotation in the vicinity of said journal end; and including a stopper rigidly joined to said housing and protruding into said journal bore, said gap defining said throttle being left between said stopper and said journal, and said measuring line branching off from said journal bore through said stopper.

* * * * *